United States Patent
Harris et al.

(10) Patent No.: US 11,242,989 B2
(45) Date of Patent: Feb. 8, 2022

(54) COMBUSTION APPARATUS

(71) Applicant: Harris Multi Jet Burner Ltd, Doncaster (GB)

(72) Inventors: Michael Harris, Doncaster (GB); Michael Harris, Jr., Doncaster (GB); Glenn Harris, Doncaster (GB)

(73) Assignee: Harris Multi Jet Burner Ltd, Doncaster (GB)

( * ) Notice: Subject to any disclaimer, the term of this patent is extended or adjusted under 35 U.S.C. 154(b) by 0 days.

(21) Appl. No.: 17/280,484

(22) PCT Filed: Sep. 13, 2019

(86) PCT No.: PCT/GB2019/052564
§ 371 (c)(1),
(2) Date: Mar. 26, 2021

(87) PCT Pub. No.: WO2020/065264
PCT Pub. Date: Apr. 2, 2020

(65) Prior Publication Data
US 2021/0341143 A1    Nov. 4, 2021

(30) Foreign Application Priority Data
Sep. 28, 2018   (GB) .................................... 1815907

(51) Int. Cl.
*F23G 5/44*   (2006.01)
*F23G 5/12*   (2006.01)
(Continued)

(52) U.S. Cl.
CPC ............. *F23G 5/444* (2013.01); *B65G 33/30* (2013.01); *F23G 5/002* (2013.01); *F23G 5/04* (2013.01);
(Continued)

(58) Field of Classification Search
CPC ............... F23G 5/444; F23G 2205/121; F23G 2203/8013; F23K 2203/202
See application file for complete search history.

(56) References Cited

U.S. PATENT DOCUMENTS 3,942,455 A    3/1976 Wallis
4,009,667 A *  3/1977 Tyer .......................... F23G 5/00
                                                           110/186
(Continued)

FOREIGN PATENT DOCUMENTS

GB    2056033 A    7/1980
JP    H0814518 A   1/1996
(Continued)

OTHER PUBLICATIONS

International Search Report and Written Opinion for PCT Application No. PCT/GB2019/052564, dated Dec. 3, 2019, 14 Pages.
(Continued)

*Primary Examiner* — David J Laux
(74) *Attorney, Agent, or Firm* — Maine Cernota & Rardin

(57) ABSTRACT

Disclosed herein is a combustion apparatus which comprises a chamber having a apertured rotatable tubular auger mounted between end walls of the chamber to convey particulate material from the region of the chamber proximate the feed inlet to the combustion gas outlet and a blower connected to the opposite end of the tubular auger and configured to blow gas into the bore of the auger and out through the apertures into the chamber.

10 Claims, 3 Drawing Sheets

(51) Int. Cl.
    *F23G 5/00*           (2006.01)
    *F23L 3/00*           (2006.01)
    *F23L 9/06*           (2006.01)
    *F23L 5/02*           (2006.01)
    *F23G 5/50*           (2006.01)
    *F23G 5/04*           (2006.01)
    *F23L 15/00*         (2006.01)
    *B65G 33/30*         (2006.01)

(52) U.S. Cl.
    CPC ............... *F23G 5/12* (2013.01); *F23G 5/50* (2013.01); *F23L 3/00* (2013.01); *F23L 5/02* (2013.01); *F23L 9/06* (2013.01); *F23L 15/00* (2013.01); *F23G 2203/8013* (2013.01); *F23G 2205/121* (2013.01); *F23G 2207/30* (2013.01); *F23K 2203/202* (2013.01)

(56) References Cited

U.S. PATENT DOCUMENTS

| | | | |
|---|---|---|---|
| 4,231,304 A | | 11/1980 | Hoskinson |
| 4,299,177 A | * | 11/1981 | Mros .............. F23K 3/14 110/101 CF |
| 4,331,084 A | * | 5/1982 | Fitch .............. F23G 5/16 110/101 CC |
| 9,052,109 B1 | * | 6/2015 | Fowler .............. C10B 47/44 |
| 2009/0205252 A1 | * | 8/2009 | Tyer .............. F23G 5/30 48/76 |

FOREIGN PATENT DOCUMENTS

| | | |
|---|---|---|
| KR | 1020080093485 A | 10/2008 |
| WO | 2012026756 A2 | 3/2012 |
| WO | 2013088478 A1 | 6/2013 |

OTHER PUBLICATIONS

Combined Search and Examination Report under Sections 17 and 18(3) for Great Britain Application No. GB1815907.9, dated Mar. 20, 2019, 7 pages.

Examination Report under Sections 18(3) for Great Britain Application No. GB1815907.9, dated Jul. 6, 2020, 3 pages.

Notification of Grant of Great Britain Application No. GB1815907.9, dated Feb. 16, 2021, 2 pages.

* cited by examiner

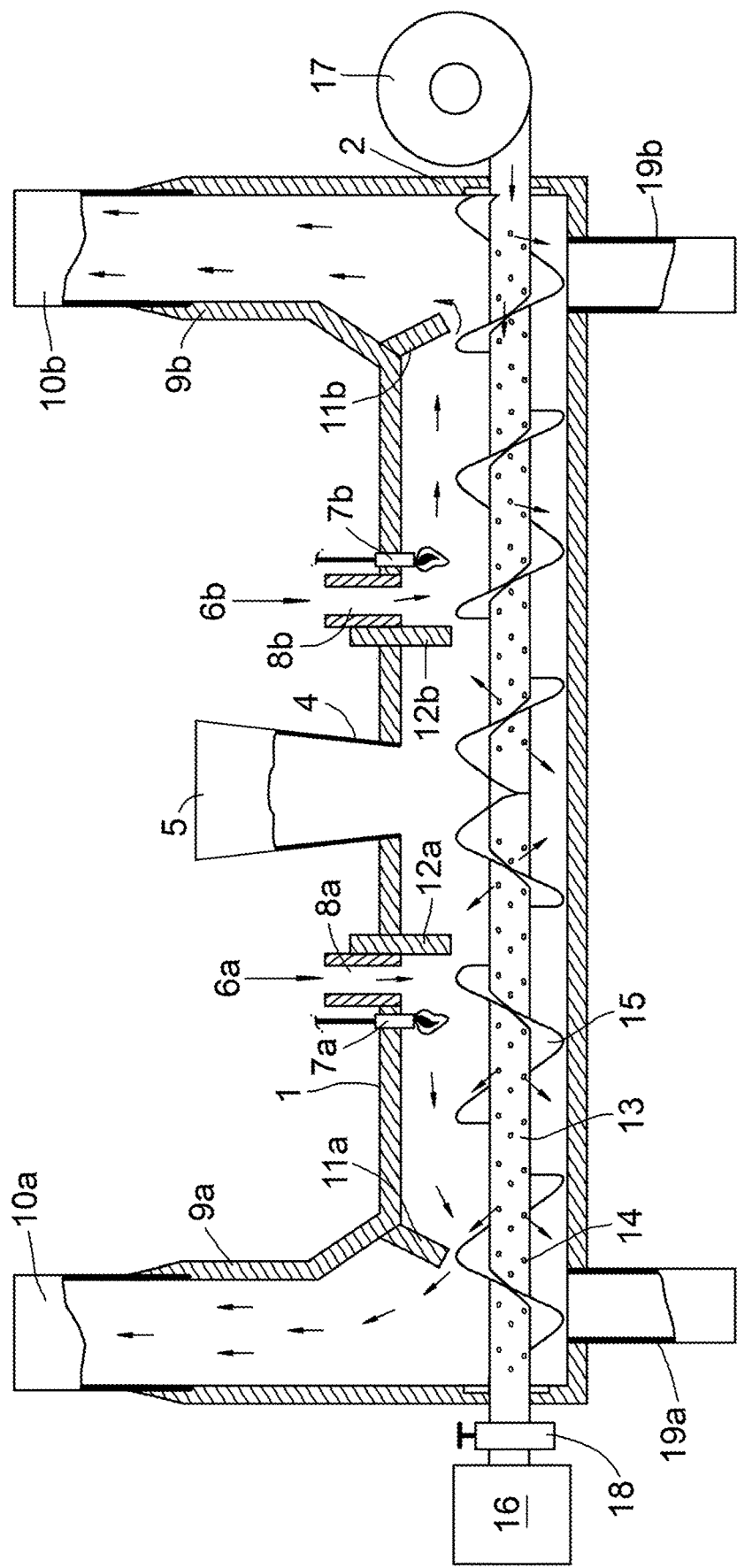

COMBUSTION APPARATUS

RELATED APPLICATIONS

This application is a national phase application filed under 35 USC § 371 of PCT Application No. PCT/GB2019/052564 with an International filing date of Sep. 13, 2019, which claims priority of GB Patent Application 1815907.9 filed Sep. 28, 2018. Each of these applications is herein incorporated by reference in its entirety for all purposes.

FIELD OF THE INVENTION

The present invention relates to a combustion apparatus suitable for combusting waste materials.

BACKGROUND TO THE INVENTION

The generation of waste is a great burden to society and infrastructure. Governments are being required to manage both domestic and commercial waste on massive scales in a manner that is sustainable over the long term. The task of dealing with the vast variety of materials in an efficient manner is therefore a challenging one.

One of the main problems when handling domestic and commercial waste materials is the generation of toxic and/or hazardous compounds which originate from the materials themselves and/or residual compounds contained within the waste. Initial processing of these materials liberates these compounds and can facilitate secondary reactions which produce further harmful compounds. This problem is exemplified when handling waste construction industry fibre board. During the initial processing the fibre board is broken down into small pieces, thereby exposing the harmful adhesives and preservatives contained within the board products.

The problems associated with burning domestic and commercial waste material are also exacerbated by dampness in the materials. Any moisture reduces the temperature of combustion and therefore changes the mixture of gasses which are liberated. Reducing the temperature also makes the burning process inefficient and increases the ash deposits left at the end.

Conventional management schemes involve deposition within land-fill sites. This is not sustainable in the long term and has environmental consequences. Other schemes involve large scale incineration to generate electricity, but this often leads to large emissions of harmful gases.

A number of devices have previously attempted to address the above problems, but these involve the generation of very high temperatures which can only be obtained by particulating the waste material into small pieces and then blowing it tangentially around a combustion chamber. This provides the combustion process with an excess amount of gas and ensures that all the material is mixed sufficiently. An example of such a device is shown in WO2015033170A1. However for these type of device to work effectively the material is required to be particulated and dried prior to combustion. This makes the whole process expensive and time consuming.

There has now been devised a combustion apparatus which over-comes and/or substantially mitigates the above referenced and/or other disadvantages associated with the prior art.

SUMMARY OF THE INVENTION

In an aspect of the invention there is provided a combustion apparatus comprising a chamber having at least one side wall extending between first and second end walls, a feed inlet for combustible material extending through the side wall, a combustion gas outlet through the side wall distal of the feed inlet, an apertured rotatable tubular auger mounted between the first and second end walls and extending along the whole length of the chamber to convey particulate material from the region of the chamber proximate the feed inlet to the combustion gas outlet, a blower connected to an end of the tubular auger and configured to blow gas into a bore of the auger and out through the apertures into the chamber, and a primary ignition device arranged in the side wall of the chamber between the feed inlet and the combustion gas outlet, the primary ignition device comprising an oil or gas burner, an igniter and a gas inlet.

The combustion apparatus according to the invention is advantageous primarily because gas driven down the bore of the auger and out through the apertures increases the combustion which speeds up the rate waste can be burnt. As cold gas is constantly blown in by the blower, during operation the apparatus is kept at an effective working temperature, rather than overheating. As gas travels through the bore it heats up and as the apertures are throughout the tubular auger the portion of the chamber which receives the combustible material from the feed inlet is fed with hot gas. This warms and dries the incoming waste material making for a more efficient combustion apparatus and negating the need to pre particulate the waste material. Pre-particulation is also not required because the apertures in the auger allow large amounts of gas flow into the chamber from the blower. The speed of the auger can be regulated in order to control the movement of material through the apparatus and therefore the combustion process. Also the speed of the blower can be regulated to control the gas out of the apertures in the auger and therefore the degree of combustion occurring along the length of the auger. As there is no gas driven vortex swirling as is seen in conventional devices the apparatus is able to combust a much wider range of materials. For example fragmented interior car parts can be burnt which (even if particulated) would normally coat the inside of the conventional combustors and prevent them from working properly.

The combustion apparatus of the invention can be used for combusting commercial or domestic materials, for example waste material. The size and constituents of the materials to be burnt will determine how fast they are burnt in the apparatus, therefore the dwell time of the material within the chamber is critical. The speed of the auger within the chamber may be varied to enable the dwell time to be optimised.

The gas is preferably air, as this is the cheapest and easiest to obtain. However other gasses such as methane, propane or butane or other combustible gasses may be used in order to achieve higher burning temperatures.

The chamber may have a single side wall (for example a chamber having a circular cross section), but preferably the chamber has a plurality of side walls. This makes it easier to incorporate any refractory material and incorporate any channels for the auger to sit in. The augers can then work more efficiently at pushing the material through the apparatus without the risk of unburnt material piling on top of them and not moving through the apparatus.

The combustion apparatus of the invention is configured to burn waste materials of all types, and is suitable for burning waste wood-based materials such as chipboard containing adhesives, where a high combustion temperature is necessary to avoid the discharge of toxic or harmful gases. The apparatus will also burn complex products such as combustible vehicle parts, including dash boards, seats, hub caps etc.

The combustion gases from the apparatus may be passed through a heat exchanger to extract useful energy and then to particulate filters/cleaners to ensure that the final discharge to the atmosphere meets appropriate standards.

In order to increase the volume of material combusted by the apparatus there may be a plurality of apertured rotatable tubular augers with each one having a bore connected to a blower. Whether there is a single auger or a plurality it is preferable that the augers are arranged in the bottom of the chamber. The bottom of the chamber is lowest internal part of the chamber. Being at the bottom means that the auger works most efficiently because all the material within the chamber will tend to fall to the bottom due to gravity.

To aid the movement of material through the apparatus the auger is preferably positioned within a channel which extends the length of the apparatus. The channel may be formed by the material of the chamber itself, however preferably the channel is formed by a refractory material which lines the inside of the chamber. Examples of suitable refractory material include refractory cement or thermal insulation material.

The apertures on each auger are preferably spaced apart from one another at regular intervals. This makes for an even combustion process along the length of the auger.

The augers are preferably made from stainless steel, but may be made from ceramic material, or other non-combustible material.

Preferably a first partial partition means is disposed internally between the primary ignition device and the feed inlet, the first partition means being configured to control the flow of material through the chamber. This has the benefit of controlling the dwell time of the combustible material within the chamber. Being positioned where it is means that the material is held for longer in the proximity of the feed inlet and therefore it dries more before it is moved further onwards by the auger. It also means that the main combustion which occurs further downstream (i.e. towards the opposite end of the chamber) is contained and premature burning of the material does not occur.

Preferably a second partial partition means is disposed between the combustion gas outlet and the primary ignition device, the second partial partition means being configured to control the flow of material through the chamber. This has the benefit of controlling the dwell time of the combustible material within the chamber. Being positioned where it is means that the material is held for longer in the proximity of the ignition device and the main combustion area of the apparatus and therefore it burns more before it is moved further onwards by the auger. It also means that the gasses which are produced from the combustion which generally occurs further downstream (i.e. towards the opposite end of the chamber) are contained and premature venting of the gasses back against the flow of the auger is prevented.

The first and second partition means are preferably internal extensions of the side wall of the chamber. The first partition means and/or the second partition means may however be moveable within the chamber. That is to say the first partition means and/or the second partition means may be capable of being raised or lowered in order to increase or decrease the spacing between the auger flights and the end of the respective partition wall. This is beneficial if larger materials are to be burnt in the apparatus, and it allows the partition means to be raised or lower to accommodate such materials accordingly. It also helps to control the dwell time.

It is recognised that when burning some materials, ash deposits may form in the chamber. Preferably therefore, a combustion ash outlet is arranged in the side wall of the chamber opposite the combustion gas outlet. The outlet allows for outlet of the ash and prevents clogging up and smothering of the combustion within the chamber.

The auger preferably comprises flights which are interrupted by gaps. In this manner the gas exiting from the apertures in the auger is communicated towards both the first and second ends of the apparatus. This has the effect that the combustion process is not limited by the flights of the auger, but occurs along the whole length of the auger. The gaps also help to allow the auger and the flights to expand as it heats up. More preferably, there may be one or more apertures in the auger within the gaps and the one or more apertures within the gaps are directed towards the end of the apparatus where the feed inlet is situated. This spreads the combustion process in a rearward direction and further ensures that all the burnable material is properly burnt before it reaches the forward parts of the apparatus (i.e. the combustion gas outlet). It also ensures that the flights of the auger do not compartmentalise the material being burnt and put it at risk of being extinguished. The gaps and the angled apertures allow the combustion to spread along the whole length of the auger.

The blower is configured to provide gas in excess into the bore of the auger and out through the apertures to ensure efficient combustion. As gas is in excess and constantly being refreshed the apparatus is maintained at a controllable temperature and doesn't get too hot. The excess gas may be tapped off in order to use for secondary purposes such as for heating secondary hot water devices or the like or heating a room. In order to tap off the gas, the end of the auger opposite the blower may comprise a tap to control the flow of gas out of the bore of the auger. Opening the tap allows gas to escape, but does not significantly affect the gas exiting the apertures in the auger as the gas is in excess as provided by the blower. The tap can also be opened to prevent any overheating of the apparatus.

The blower may be connected to either end of the auger. It is recognised that the apparatus will work best if the blower is mounted at the hottest end of the auger. That is the end where the combustion gasses are escaping. So this will be the end proximal the combustion gas outlet. This means that the gas travelling through the bore of the auger heats up and when it reaches the region of the chamber where the feed inlet is positioned it is hot, and this has the effect of drying the incoming feed matter. However it is possible to connect the blower to the end of the auger which is proximal the feed inlet. It will just take longer for the gas within the auger to heat up as it will be required to circulate within the bore before it reaches proper drying temperature.

In order to further increase the amount of gas being put into the chamber to further improve the combustion process, preferably the side wall of the chamber comprises a plurality of apertures, with each aperture being in fluid communication with a secondary gas blower.

It is recognised that the apparatus according to the invention is beneficial as large amounts of un-processed material can be combusted. In some embodiments however it is beneficial to further increase the throughput through the apparatus. The feed inlet for combustible material may therefore be arranged around the midpoint of the chamber between the two ends, the tubular auger may comprise flights configured to direct the combustible material in opposite directions towards the two ends away from the feed inlet, there may be two combustion gas outlets through the side wall distal of the feed inlet, one at each end of the chamber in the side wall of the chamber and there may be two primary ignition devices either side of the feed inlet. This effectively doubles up the combustion process as the auger drives the material in two opposite directions from the single feed inlet. In such an embodiment, there may be two combustion ash outlets arranged in the side wall of the chamber each one opposite each combustion gas outlet.

There may be a plurality of combustion gas outlets, depending on the material being burnt or the number of augers.

BRIEF DESCRIPTION OF THE DRAWINGS

In the drawings, which illustrate an exemplary embodiment of the invention:

FIG. 3 is a diagrammatic cross-sectional side elevation of a third embodiment of the combustion apparatus.

DETAILED DESCRIPTION OF THE ILLUSTRATED EMBODIMENT

Figure 1:
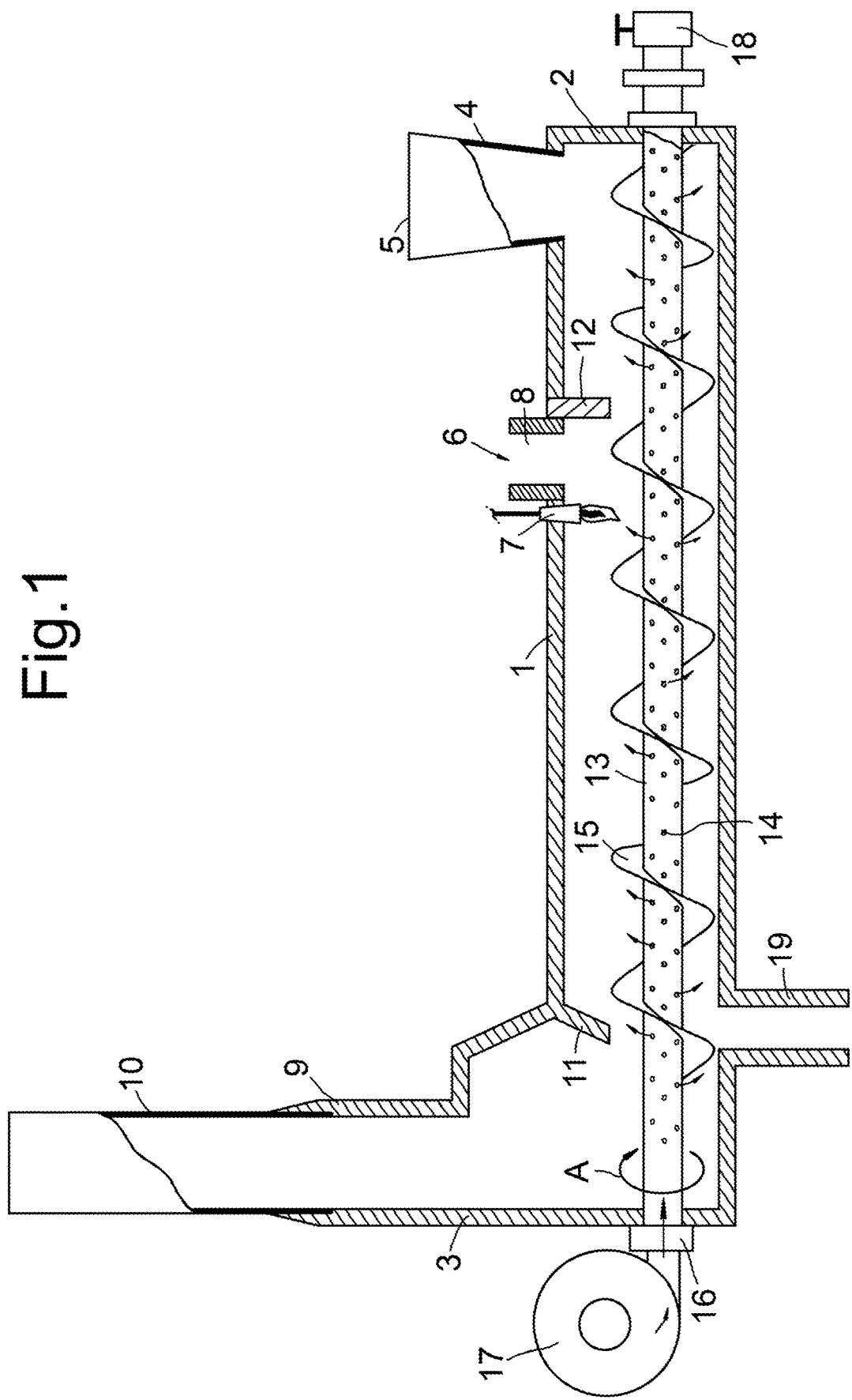
FIG. 1 is a diagrammatic cross-sectional side elevation of a first embodiment of the combustion apparatus.

The combustion apparatus (as shown in FIG. 1) comprises a tubular combustion chamber 1, suitably formed of steel lined with refractory material such as a refractory cement. Thermal insulation material may also be incorporated to minimise heat losses from the chamber. The chamber has four side walls and first and second end walls 2 and 3. The top wall of the chamber 1 has a feed inlet 4, which in the example shown in FIG. 1 is proximal the first end wall 2. The feed inlet 4 comprises a hopper 5 for receiving combustible material. The wall of the chamber 1 also has an ignition means 6 which comprises an ignitor 7, an oil supply (not shown) and a gas inlet 8 through the side wall of the chamber 1. Distal of the feed inlet 4 there is a combustion gas outlet 9, which is in the side wall of the chamber 1 proximal the end wall 3. The combustion gas outlet 9 comprises a flue pipe 10. The outlet 9 suitable formed of steel lined with refractory material such as refractory cement. The flue pipe is a suitably formed from conventional exhaust material. Internal of the chamber there two partition walls 11, 12. The walls 11, 12 project inwards from the side wall of the chamber partially across the internal width of the chamber. Wall 11 is positioned adjacent the outlet 9 and wall 12 is positioned adjacent the inlet 8 on the feed inlet side of the inlet 8. The partition walls 11, 12 are suitably formed of steel lined with a refractory material. Through the lower part of the chamber 1 there is an auger 13. The auger 13 is mounted at one end to the first end wall 2 and at the opposite end to the second end wall 3. The mounting is by 3 or more rotational bearings which engage around the circumference of the shaft of the auger. In this manner the auger is free to expand and contract laterally. The auger sits within a channel formed from the refractory material which lines the inside of the chamber. The auger 13 is constructed of a hollow tube with apertures 14 evenly spaced along the whole length of the tube. The flights 15 of the auger also extend along the whole length of the tube. The auger 13 is suitably mounted to the end walls with rotational bearings which allow the auger 13 to rotate about its longitudinal axis as shown by arrow A. The flights 15 are configured as shown in FIG. 1 so that when the auger rotates in the direction shown in FIG. 1 any material within the chamber is pushed from the inlet 4 in the region of the end wall 2 towards the outlet 9. The tubular part of the auger 13 may have any cross sectional shape. Therefore it could be triangular or square for example. Rotation of the auger 13 is driven by a motor 16 which is connected to the auger 13 and mounted to the exterior of the end wall 3. The speed of the motor 16 can be controlled to deliver the waste material at a desired rate to maintain full combustion. The motor may alternatively be mounted at the opposite end of the chamber on the wall 2 and connected to the auger in the same manner therein. Alternatively, there may be two motors, one at either end of the chamber and connected to both ends of the auger 13. A blower 17 is connected to the bore of the auger 13 and is configured to blow gas into the auger 13 when required. The gas blown into the bore of the auger 13 travels down the auger and out of the apertures 14. The end of the auger 13 opposite the blower 17 has a tap 18 connected to it. The tap 18 can be opened to allow gas out of the tube and therefore reduce the temperature of the apparatus. An outlet for ash 19 is positioned in a bottom wall of the chamber distal of the inlet 4.

In use waste material is loaded into the hopper 5 which feeds directly to the feed inlet 4. This loads up the chamber in the gas proximal the end wall two. The motor 16 which drives the auger 13 is switched on and the material begins to travel towards the end wall 3. When the material reaches the region of the primary ignition means 6, an oil fuel supply is fed into the chamber and the mixture of waste and oil ignited by the igniter 7. Gas is supplied for this initial combustion from the inlet 8. After about 30 minutes the primary ignition means 6 is switched off as the apparatus becomes self-sustaining, that is to say, the feed of material from the inlet 4 using the auger 13 is sufficient to maintain the combustion of the material which is moving along the chamber. It will be recognised that the main combustion of the waste occurs around the central section of the chamber. In order to maintain the combustion of the waste material in this self-sustaining manner gas is blow into it from the blower 17 which blows gas down the bore of the auger and out through the apertures 14. Gas is provided in this manner in excess and this creates temperatures in the region of 1000° C.-1200° C. within the chamber. If the temperature of the apparatus gets too hot then the tap 18 can be opened to allow hot gas out. This hot gas is at about 100° C. and can be used for secondary heating means such as heating a room or a hot water system. The material continues to burn and be pushed along towards the end wall 3 by the auger. By the time it reaches the end wall 3 it has all but combusted and what remains is ash and gas. The gases vent through the gas outlet 9 and the ash is deposited out of the ash outlet 19. One important feature of the apparatus is that as the central part of the chamber heats up it heats up the gas within the bore of the auger blown in by the blower. This gas is blown all along the auger, so after the 30 minute period of pre-combustion described above, hot gas exits from the apertures 14 in the region of the feed inlet 4. This hot gas dries the waste feed material before it moves further into the main combustion zone of the chamber. As external gas is constantly being blown into the chamber in this manner, the temperature of the combustion is also maintained and does not get out of control. The partition wall 12 further helps with this as it prevents any unburnt feed material within this region from moving too fast into the main combustion area of the chamber. The partition wall 12 therefore ensures that the material to be combusted in the chamber is fully dry. It should be noted that both partition walls 11 and 12 extend from the inside of the chamber wall and stop just before the limit of the flights on the auger 13. The auger 13 is positioned just below the partitions 11, 12 and is free to sufficiently rotate. The partition wall 11 has a similar purpose in that it prevents the combusting material from exiting out of the outlet 9 too soon. It therefore ensures complete combustion. It has been found that the apparatus can burn 400-500 kg of material per hour.

Figure 2:
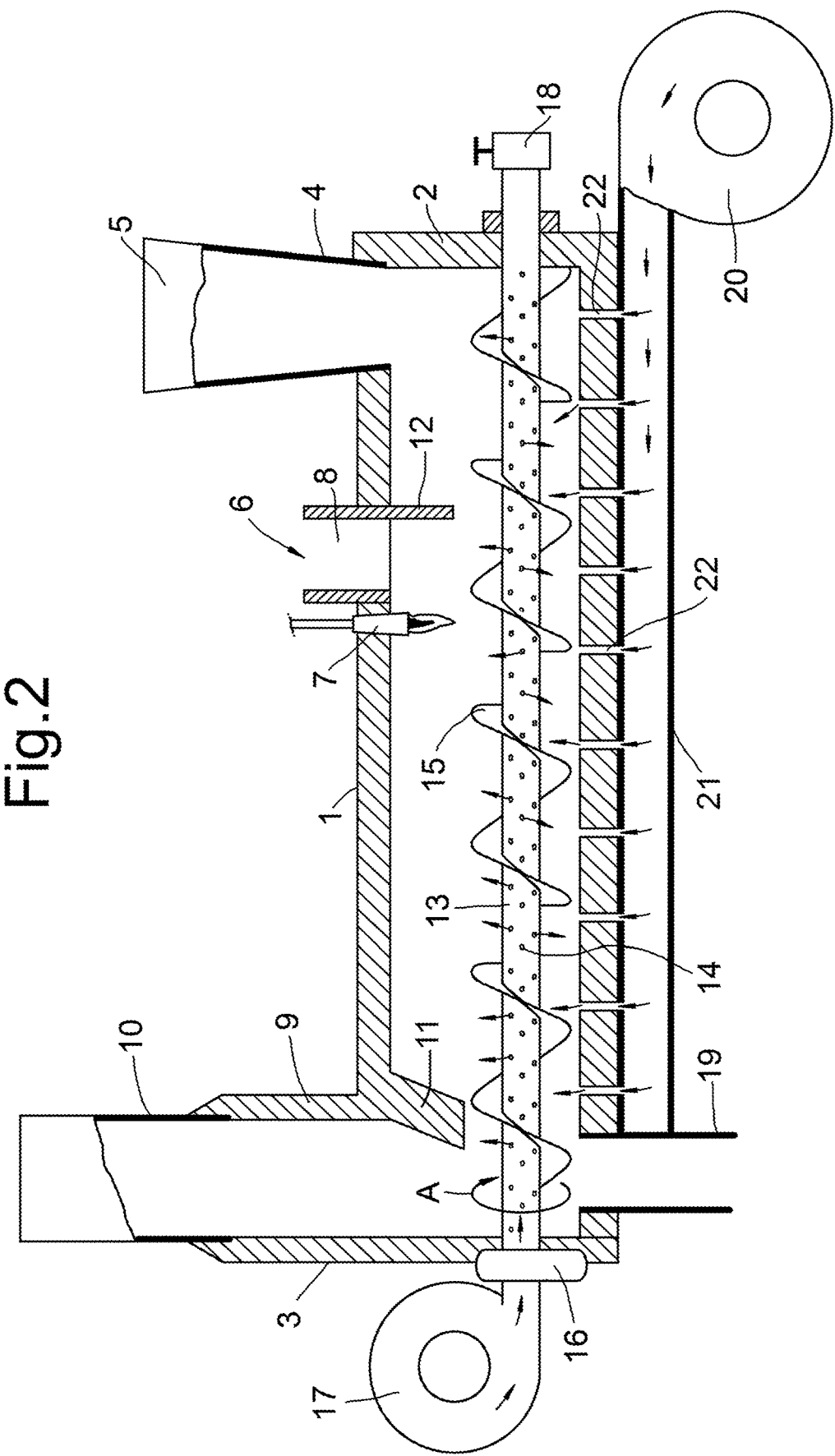
FIG. 2 is a diagrammatic cross-sectional side elevation of a second embodiment of the combustion apparatus.

In another embodiment of the apparatus (as shown in FIG. 2), the apparatus comprises substantially all of the features of the apparatus of FIG. 1, but with a few extra features. Importantly a secondary blower 20 is provided which has an outlet connected to a duct 21. The duct 21 has apertures 22. The duct 21 is arranged on a bottom wall of the chamber 1, and in this embodiment, said bottom wall is provided with apertures 23. The spacing and size of the apertures 22 matches that of the apertures 23. The duct 21 is mounted against the wall in such a manner that the apertures 22 line up with the apertures 23. Both sets of apertures extend substantially along the whole length of the chamber 1. In use, whilst the apparatus is working as described above, the secondary blower 20 is operated and this blows gas into the duct 21 and then through the apertures 22, 23 into the chamber 1. This further increases the gas supply to the combusting material within chamber 1 and results in an embodiment of the invention that is able to combust at higher temperatures, burn larger pieces of material, and burn a greater range of different types of material.

In another embodiment (as shown in FIG. 3) the combustion apparatus comprises a combustion chamber 1, suitably formed of steel lined with refractory material such as a refractory cement. Thermal insulation material may also be incorporated to minimise heat losses from the chamber. The chamber has four side walls and first and second end walls 2 and 3. The top side wall of the chamber 1 has a feed inlet 4, which in the example shown in FIG. 3 is positioned generally centrally between the two end walls 2, 3. The feed inlet 4 comprises a hopper 5 for receiving combustible material. The wall of the chamber 1 also has two ignition means 6a and 6b which both comprise an ignitor 7a, 7b, an oil supply (not shown) and a gas inlet 8a, 8b through the side wall of the chamber 1. The ignition means 6a and 6b are positioned wither side of the feed inlet 4. Distal of the feed inlet 4 in both directions there are two combustion gas outlets 9a and 9b, which is in the side wall of the chamber 1 proximal the end wall 3 and the end wall 2, respectively. The combustion gas outlets 9a and 9b each comprise a flue pipe 10a and 10b. The outlets 9a and 9b are suitably formed of steel lined with refractory material such as refractory cement. The flue pipes are suitably formed from conventional exhaust material. Internal of the chamber 1 there two sets of partition walls 11a, 12a and 11b, 12b. The walls 12a and 12b are positioned adjacent the inlets 8a and 8b respectively on the feed inlet side of the gas inlet 8a and 8b. The walls 11a and 11b are positioned adjacent the outlets 9a and 9b respectively. The walls 11a, 11b, 12a, 12b project inwards from the side wall of the chamber 1 partially across the internal width of the chamber 1. The partition walls 11a, 11b, 12a, 12b are suitably formed of steel lined with a refractory material. Through the lower part of the chamber 1 there is an auger 13. The auger 13 is mounted at one end to the first end wall 2 and at the opposite end to the second end wall 3. The mounting is by 3 or more rotational bearings which engage around the shaft of the auger. In this manner the auger is free to expand and contract laterally. The auger sits within a channel formed from the refractory material which lines the inside of the chamber. The auger 13 is constructed of a hollow tube with apertures 14 evenly spaced along the whole length of the tube. The flights 15 of the auger also extend along the whole length of the tube. The auger 13 is suitably mounted to the end walls with rotational bearings which allow the auger 13 to rotate about its longitudinal axis as shown by arrow A. The tubular part of the auger 13 may have any cross sectional shape. Therefore it could be triangular or square for example. The flights 15 are configured as shown in FIG. 3 so that when the auger rotates in the direction shown in FIG. 3 any material within the chamber is pushed from the inlet 4 in the central region towards the outlets 9a and 9b. To achieve this the flights on one half of the auger are mounted onto the tubular shaft in a clockwise direction and on the other half in an anticlockwise direction. Rotation of the auger 13 is driven by a motor 16 which is connected to the auger 13 and mounted to the exterior of the end wall 3. The speed of the motor 16 can be controlled to deliver the waste material at a desired rate to maintain full combustion. The motor may alternatively be mounted at the opposite end of the chamber on the wall 2 and connected to the auger in the same manner therein. Alternatively, there may be two motors, one at either end of the chamber and connected to both ends of the auger 13. A blower 17 is connected to the bore of the auger 13 and is configured to blow gas into the auger 13 when required. The gas blown into the bore of the auger 13 travels down the auger and out of the apertures 14. The end of the auger 13 opposite the blower has a tap 18 connected to it. The tap 18 can be opened to allow gas out of the tube and therefore reduce the temperature of the apparatus. Two outlets 19a and 19b for ash are positioned in a bottom wall of the chamber distal of the inlet 4, one adjacent each end of the chamber 1.

In use of the embodiment of the apparatus as shown in FIG. 3, waste material is loaded into the hopper 5 which feeds directly to the feed inlet 4. This loads up the chamber in the central area proximal the feed inlet 4. The motor 16 which drives the auger 13 is switched on and the material begins to travel towards the end wall 3 and the end wall 2. When the material reaches the region of the primary ignition means 6a and 6b, an oil fuel supply is fed into the chamber and the mixture of waste and oil ignited by the igniter 7a and 7b. Gas is supplied for this initial combustion from the inlet 8a and 8b. In this embodiment two combustion process are hence started simultaneously. After about 30 minutes the primary ignition means 6a and 6b are switched off as the apparatus becomes self-sustaining, that is to say, the feed of material from the inlet 4 using the auger 13 is sufficient to maintain the combustion of the material which is moving along the chamber 1. In order to maintain the combustion of the waste material in this self-sustaining manner gas is blow into it from the blower 17 which blows gas down the bore of the auger 13 and out through the apertures 14. Gas is provided in this manner in excess which maximises the combustion and this creates temperatures in the region of 1000° C.-1200° C. within the chamber. If the temperature of the apparatus gets too hot then the tap 18 can be opened to allow hot gas out. This hot gas is at about 100° C. and can be used for secondary heating means such as heating a room or a hot water system. The material continues to burn and be pushed along towards the end wall 3 and end wall 2 by the auger 13. By the time it reaches the end wall 3 and the end wall 2 it has all but combusted and what remains is ash and gas. The gases vent through the gas outlet 9a and 9b and the ash is deposited out of the ash outlet 19a and 19b. One important feature of the apparatus is that as the central part of the chamber heats up it heats up the gas within the bore of the auger blown in by the blower. This gas is blown all along the auger, so after the 30 minute period of pre-combustion described above, hot gas exits from the apertures 14 in the region of the feed inlet 4. This hot gas dries the waste feed material before it moves further into the main combustion zone of the chamber. As external gas is constantly being blown into the chamber in this manner, the temperature of the combustion is also maintained and does not get out of control. The partition walls 12a and 12b further helps with this as they prevent any unburnt feed material within this region from moving too fast into the main combustion area of the chamber. The partition walls 12a and 12b therefore ensure that the material to be combusted in the chamber is fully dry. It should be noted that both partition walls 11a, 11b, 12a, 12b extend from the inside of the chamber wall and stop just before the limit of the flights on the auger 13. The auger 13 is positioned just below the partitions 11a, 11b, 12a, 12b and is free to sufficiently rotate. The partition wall 11a and 11b have a similar purpose in that they prevent the combusting material from exiting out of the outlets 9a and 9b too soon. They therefore ensures complete combustion. The embodiment of the apparatus shown in FIG. 3 is thereby specially adapted burning large quantities of material with the use of two directional auger driven by a single motor or rotational means.

As described earlier the auger 13 may have gaps within the flights. Therefore in further examples of the invention there is provided an apparatus as shown in FIG. 1, 2 or 3 and substantially as described above, but where the flights on the auger are separated by gaps. The gaps are present at regular intervals around the auger 13. The gaps are areas devoid of flights. In these further examples the auger 13 is configured so that there is always one aperture 14 in the tube of the auger within the area taken up by each gap. Furthermore, the apertures within the gaps are directed rearwardly, as compared with all the other apertures in these examples and those in FIG. 1, 2 or 3 which are directed generally at right angles to the tube of the auger 13. Rearwardly means towards the end of the apparatus where the feed inlet 4 is positioned. The rearwardly directed apertures which direct gas through the gaps in the auger flights mean that gas from the blower which exits the apertures is directed rearwards over less combusted material as the auger motions to push the material in the forwards direction towards the gas outlet. This ensures that the material along the length of the auger that is surrounded by the flights, the channel the auger sits in and the auger tube does not extinguish itself due to lack of gas. The gas directed rearwardly from the rearwardly directed apertures always ensures that material along the length of the auger is supplied with sufficient gas for combustion.

The invention claimed is:

1. A combustion apparatus comprising:
   a chamber having at least one side wall extending between first and second end walls,
   a feed inlet for combustible material extending through the side wall,
   a combustion gas outlet through the side wall distal of the feed inlet,
   an apertured rotatable tubular auger mounted between the first and second end walls and extending along the whole length of the chamber to convey particulate material from the region of the chamber proximate the feed inlet to the combustion gas outlet,
   a blower connected to an end of the tubular auger and configured to blow gas into a bore of the auger and out through the apertures into the chamber, and
   a primary ignition device arranged in the side wall of the chamber between the feed inlet and the combustion gas outlet, the primary ignition device comprising an oil or gas burner, an igniter and a gas inlet,
   wherein the auger comprises flights which are interrupted by gaps.

2. The combustion apparatus according to claim 1, wherein there are a plurality of apertured rotatable tubular augers with each one having a bore connected to a blower.

3. The combustion apparatus according to claim 1, wherein a first partial partition is disposed internally between the primary ignition device and the feed inlet, the first partition being configured to control the flow of material through the chamber.

4. The combustion apparatus according to claim 1, wherein a second partial partition is disposed between the combustion gas outlet and the primary ignition device, the second partial partition being configured to control the flow of material through the chamber.

5. The combustion apparatus according to claim 1, wherein a combustion ash outlet is arranged in the side wall of the chamber opposite the combustion gas outlet.

6. The combustion apparatus according to claim 5, wherein there are one or more apertures in the auger within the gaps and the one or more apertures within the gaps are directed towards the end of the apparatus where the feed inlet is situated.

7. The combustion apparatus according to claim 1, wherein the end of the auger opposite the blower comprises a tap for controlling gas from the blower out of the bore of the auger.

8. The combustion apparatus according to claim 1, wherein the side wall of the chamber comprises a plurality of apertures, with each aperture being in fluid communication with a secondary gas blower.

9. The combustion apparatus according to claim 1, wherein the feed inlet for combustible material is arranged around the midpoint of the chamber between the two ends,
   wherein the tubular auger comprises flights configured to direct the combustible material in opposite directions towards the two ends away from the feed inlet,
   wherein there are two combustion gas outlets through the side wall distal of the feed inlet, one at each end of the chamber in the side wall of the chamber, and
   wherein there are two primary ignition devices either side of the feed inlet.

10. The combustion apparatus according to claim 9, wherein there are two combustion ash outlets arranged in the side wall of the chamber each one opposite each combustion gas outlet.

* * * * *